United States Patent [19]

Martin

[11] 3,938,819
[45] Feb. 17, 1976

[54] SLIDABLE MULTIPURPOSE CONTAINER DEVICE
[75] Inventor: William F. Martin, Ridgewood, N.J.
[73] Assignee: The Raymond Lee Organization, Inc., New York, N.Y. ; a part interest
[22] Filed: Nov. 7, 1974
[21] Appl. No.: 521,678

[52] U.S. Cl. .................................................. 280/19
[51] Int. Cl.² ......................................... B62B 15/00
[58] Field of Search........ 280/19, 79.1, 47.34, 12 R; 220/4 F, 1 R

[56] References Cited
UNITED STATES PATENTS

| 2,593,809 | 4/1952 | Stoddard | 28/19 |
| 2,729,386 | 1/1956 | Haddad | 220/4 F |
| 2,914,210 | 11/1959 | Paston | 220/4 F |
| 3,012,794 | 12/1961 | Barbiaux | 280/19 |
| 3,125,353 | 3/1964 | Gohmann | 280/47.34 |

Primary Examiner—Robert R. Song
Attorney, Agent, or Firm—Daniel Jay Tick

[57] ABSTRACT

A sheet-like bottom has a rounded leading edge. A sheet-like front is affixed to and extends from the bottom at right angles thereto. A pair of sheet-like sides are affixed to the sides of the bottom in parallel spaced relation and extend from the bottom at right angles thereto. A sheet-like back is removably positioned at right angles to the bottom and the sides to form a rectilinear container.

3 Claims, 3 Drawing Figures

SLIDABLE MULTIPURPOSE CONTAINER DEVICE

DESCRIPTION OF THE INVENTION

The present invention relates to a slidable multipurpose container device.

Objects of the invention are to provide a slidable multipurpose container device of simple structure, which is inexpensive in manufacture, usable as a sledge-type container on all types of surfaces, including snow, mud, earth, grass, sand, ice and the like for hauling all types of items, children and people with facility, convenience and efficiency.

In order that the invention may be readily carried into effect, it will now be described with reference to the accompanying drawing, wherein.

In the FIGS., the same components are identified by the same reference numerals.

Figure 1:
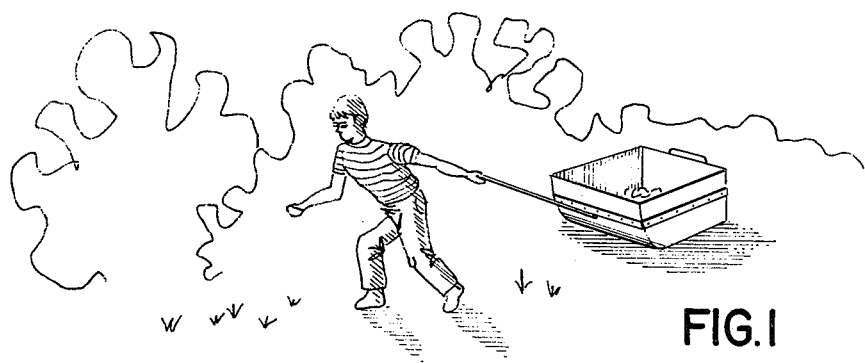
FIG. 1 is a schematic diagram of an embodiment of the slidable multipurpose container device of the invention in use.
Figure 2:
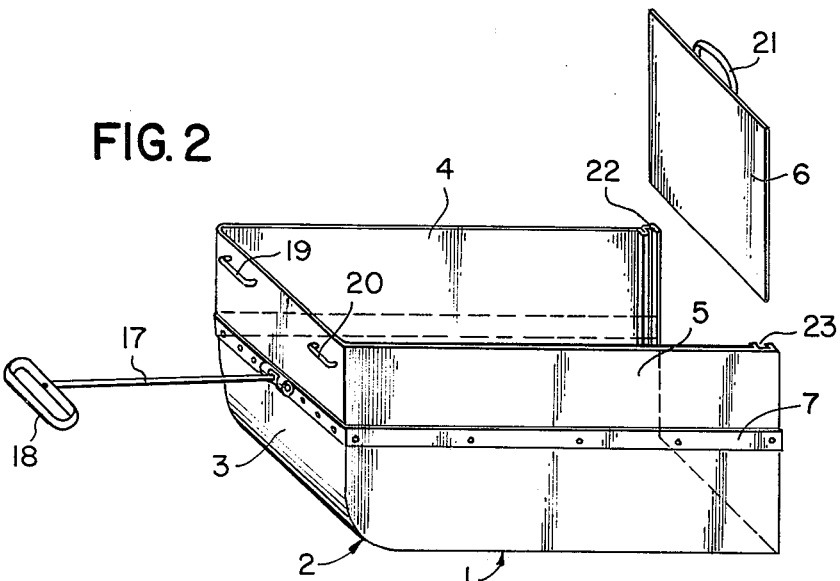
FIG. 2 is a schematic diagram of an embodiment of the slidable multipurpose container device of the invention.
Figure 3:
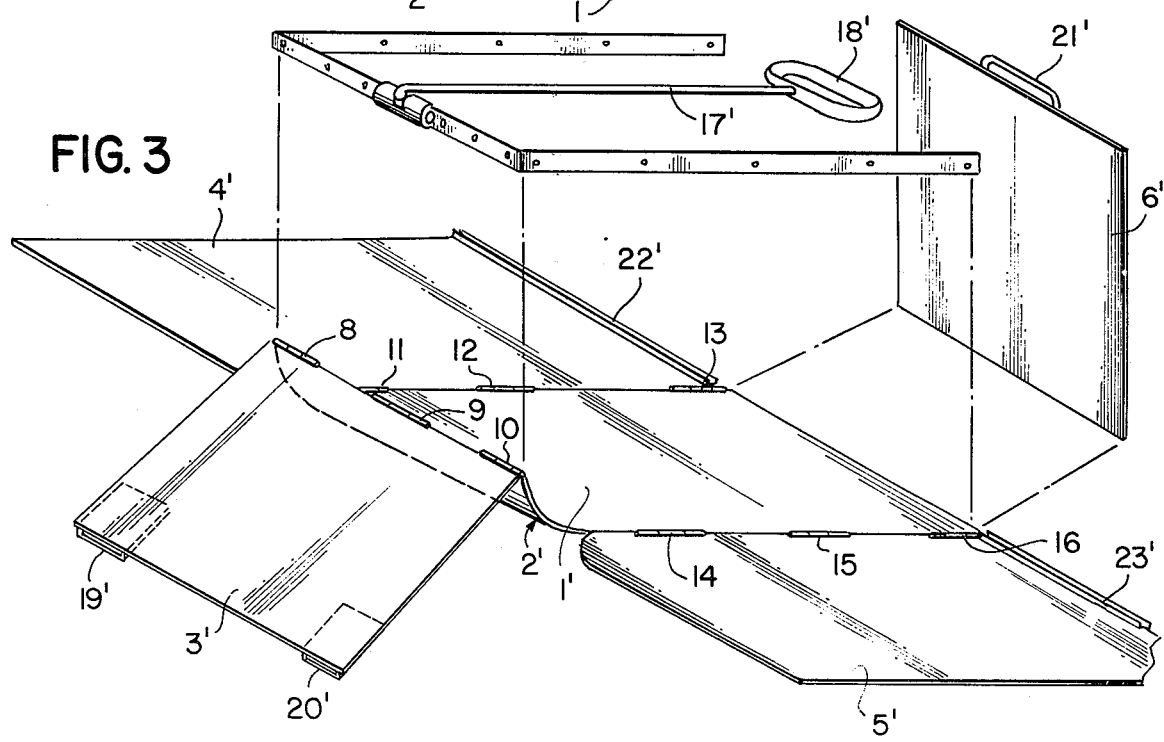
FIG. 3 is an exploded view of another embodiment of the slidable multipurpose container device of the invention.

The slidable multipurpose container device of the invention comprises a sheet-like bottom 1 (FIG. 2) or 1' (FIG. 3) having a rounded leading edge 2 (FIG. 2) or 2' (FIG. 3). A sheet-like front 3 (FIG. 2) or 3' (FIG. 3) is affixed to and extends from the bottom 1 or 1' at substantially right angles thereto.

A pair of sheet-like sides 4 and 5 (FIG. 2) or 4' and 5' (FIG. 3) are affixed to the sides of the bottom 1 or 1' in substantially parallel spaced relation and extend from the bottom at substantially right angles thereto.

A sheet-like back 6 (FIG. 2) or 6' (FIG. 3) is removably positioned at substantially right angles to the bottom 1 or 1' and the sides 4 and 5 or 4' and 5' to form a substantially rectilinear container.

In the embodiment of FIG. 2, the front 3 is affixed to, or is integrally formed with, the bottom 1 and each of the sides 4 and 5 is affixed to the bottom and the front. A substantially U-shaped member 7 reinforces and strengthens the structure.

In the embodiment of the FIG. 3, the front 3' and each of the sides 4' and 5' are hingedly affixed to the bottom 1' via hinges 8, 9 and 10, 11, 12 and 13, and 14, 15 and 16, respectively, of any suitable type.

A substantially rod-like member 17 (FIG. 2) or 17' (FIG. 3) is swively mounted on the front 3 or 3', respectively, and extends forward thereof. A loop handle 18 (FIG. 2) or 18' (FIG. 3) is provdied at the free end of the rod-like member 17 or 17', respectively.

A pair of spaced handles 19 and 20 (FIG. 2) or 19' and 20' (FIG. 3) are affixed to the front 3 or 3'. A handle 21 (FIG. 2) or 21' (FIG. 3) is affixed to the top of the back 6 or 6'.

Track members 22 and 23 (FIG. 2) or 22' and 23' (FIG. 3) are provided on the rear ends of the sides 4 and 5 or 4' and 5' in facing relationship for removably positioning the back 6 or 6', respectively.

While the invention has been described by means of specific examples and in specific embodiments, I do not wish to be limited thereto, for obvious modifications will occur to those skilled in the art without departing from the spirit and scope of the invention.

I claim:

1. A slidable multipurpose container device, comprising
   a sheet-like bottom having a rounded leading edge;
   a sheet-like front affixed to and extending from the bottom at substantially right angles thereto;
   a pair of sheet-like sides affixed to the sides of the bottom in substantially parallel spaced relation and extending from the bottom at substantially right angles thereto;
   a sheet-like back removably positioned at substantially right angles to the bottom and the sides to form a substantially rectilinear container;
   a substantially rod-like member swively mounted on the front and extending forward thereof and a loop handle at the free end of the rod-like member; and
   track members on the rear ends of the sides in facing relationship removably positioning the back.

2. A container device as claimed in claim 1, further comprising a pair of spaced handles affixed to the front and a handle affixed to the top of the back.

3. A container as claimed in claim 1, wherein the front and each of the sides are hingedly affixed to the bottom.

* * * * *